United States Patent [19]
Durkin et al.

[11] Patent Number: 5,567,164
[45] Date of Patent: Oct. 22, 1996

[54] METHOD OF FACILITATING LEARNING USING A LEARNING COMPLEX

[75] Inventors: James C. Durkin; Francine P. Foster, both of Poway, Calif.

[73] Assignee: Creative Learning Systems, Inc., San Diego, Calif.

[21] Appl. No.: 209,945

[22] Filed: Mar. 11, 1994

[51] Int. Cl.$^6$ .................................................. A47B 39/00
[52] U.S. Cl. .......................................................... 434/432
[58] Field of Search ............................... 434/72, 79, 431, 434/432, 433

[56] References Cited

PUBLICATIONS

"Plug–In Schools: Next Step In Educational Design?", Architectural Forum Magazine, Aug. 1963, pp. 68–73.

Primary Examiner—Gene Mancene
Assistant Examiner—Jeffrey A. Smith
Attorney, Agent, or Firm—Bernard L. Kleinke; Peter P. Scott

[57] ABSTRACT

This learning system includes a re-configurable learning zone composed of a large number of free-standing work/learn islands distributed about a large open interior space of a building structure, to provide for a variety of re-configurable areas to facilitate the learning of a variety of topics or subject matters to be learned. A series of fixed learning zones are disposed generally along the periphery of the interior space to serve as meeting and project areas to help facilitate a group of advanced learners that has progressed from initiatory activities at the re-configurable islands to cooperating with one another in complex team projects. The re-configurable zone is disposed intermediate to an entrance way or gateway to the interior space and the remotely located fixed learning zones, so that as the learners enter the space via the entrance way, they are exposed to substantially the entire context of the arrangement of learning zones with the proximate zone being of lessor complexity and the more remote zone or zones being of greater complexity to help provide the learners with a more comfortable feeling upon entering and progressing through the learning environment, thereby facilitating and enriching the learning experience to achieve a balance between the complexity of the topics being learned and the arrangement and configuration of the learning environment for a relatively large number of learners being exposed to the system.

13 Claims, 9 Drawing Sheets

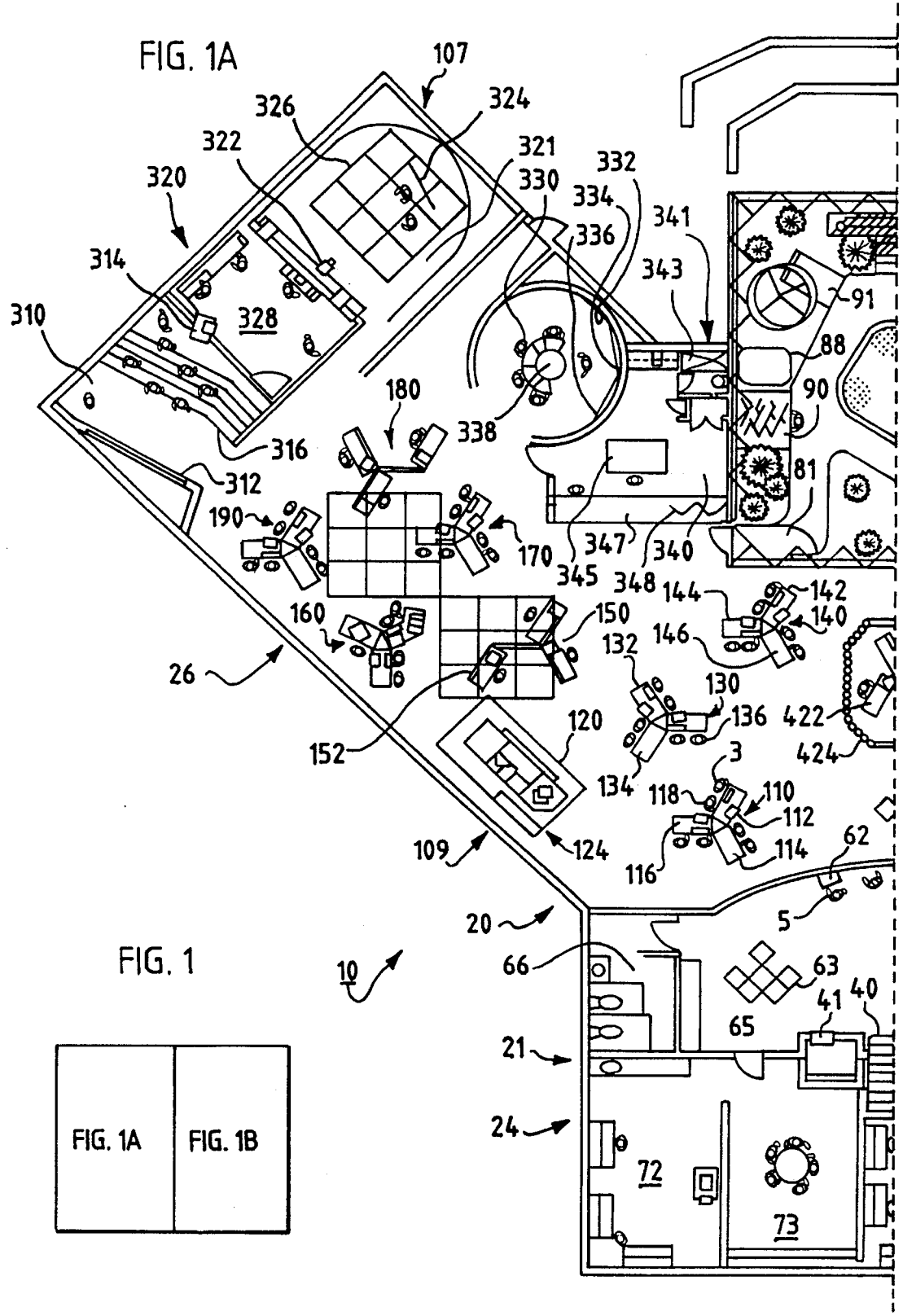

| FIG. 4A | FIG. 4B | FIG. 4C |

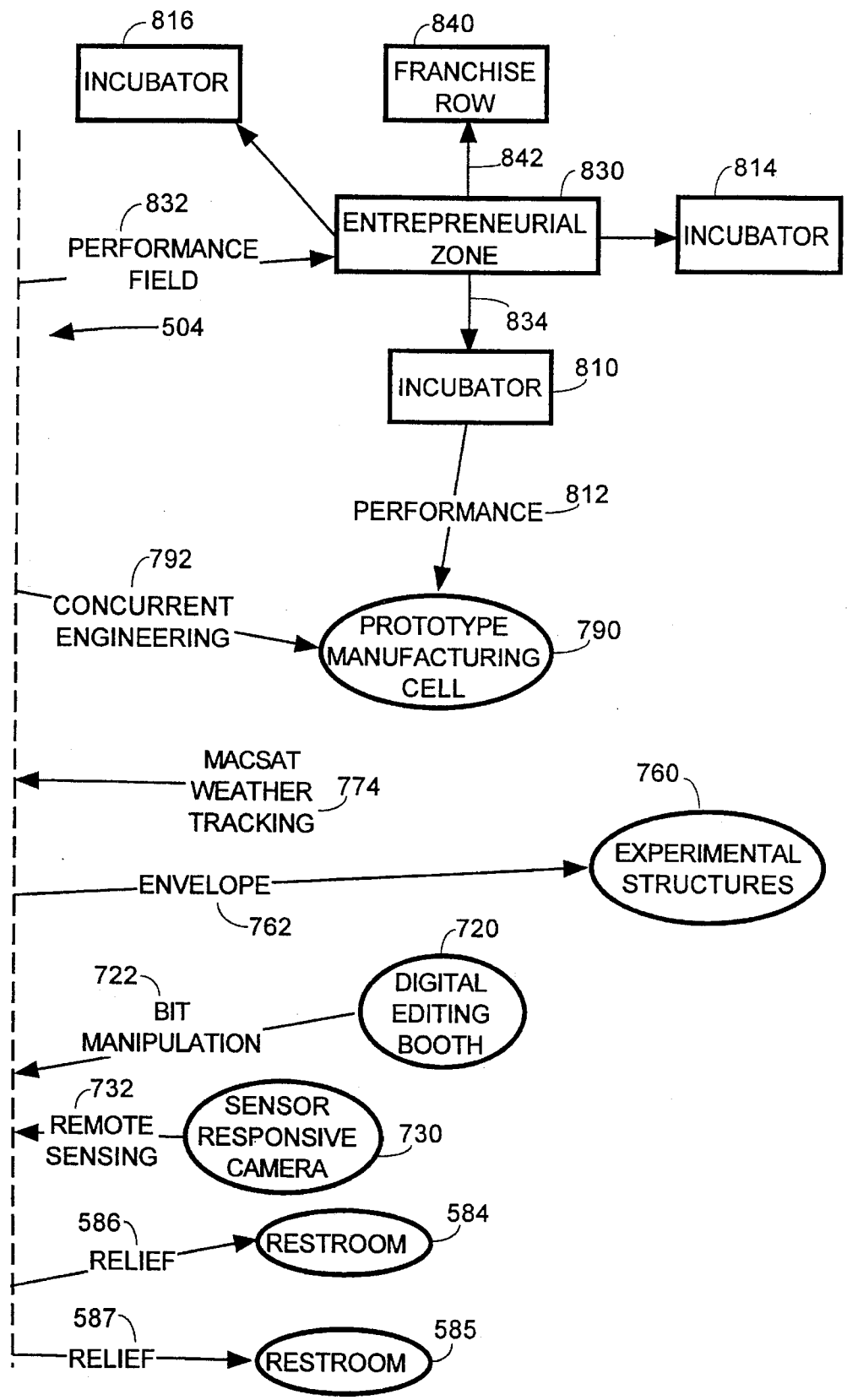

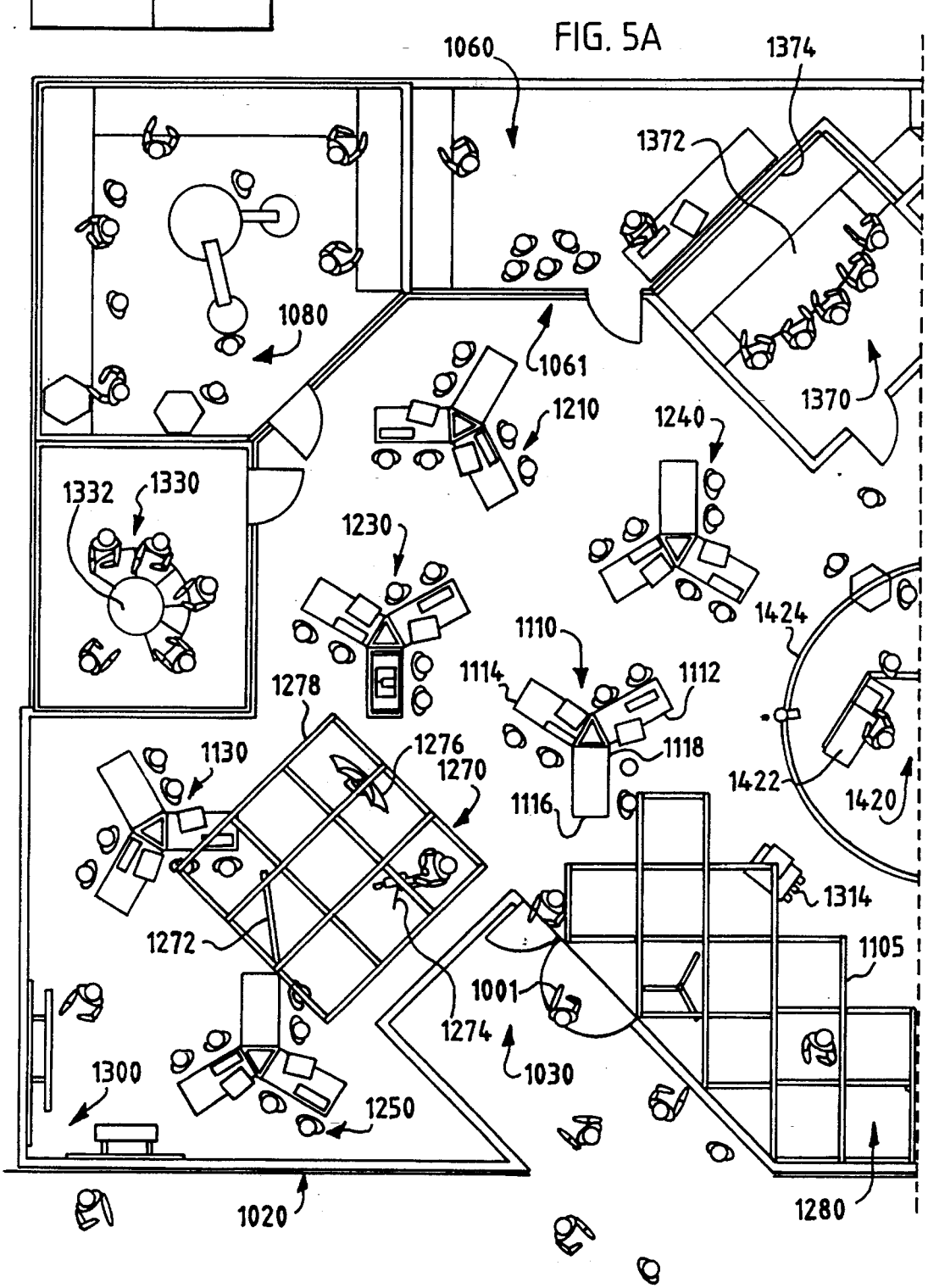

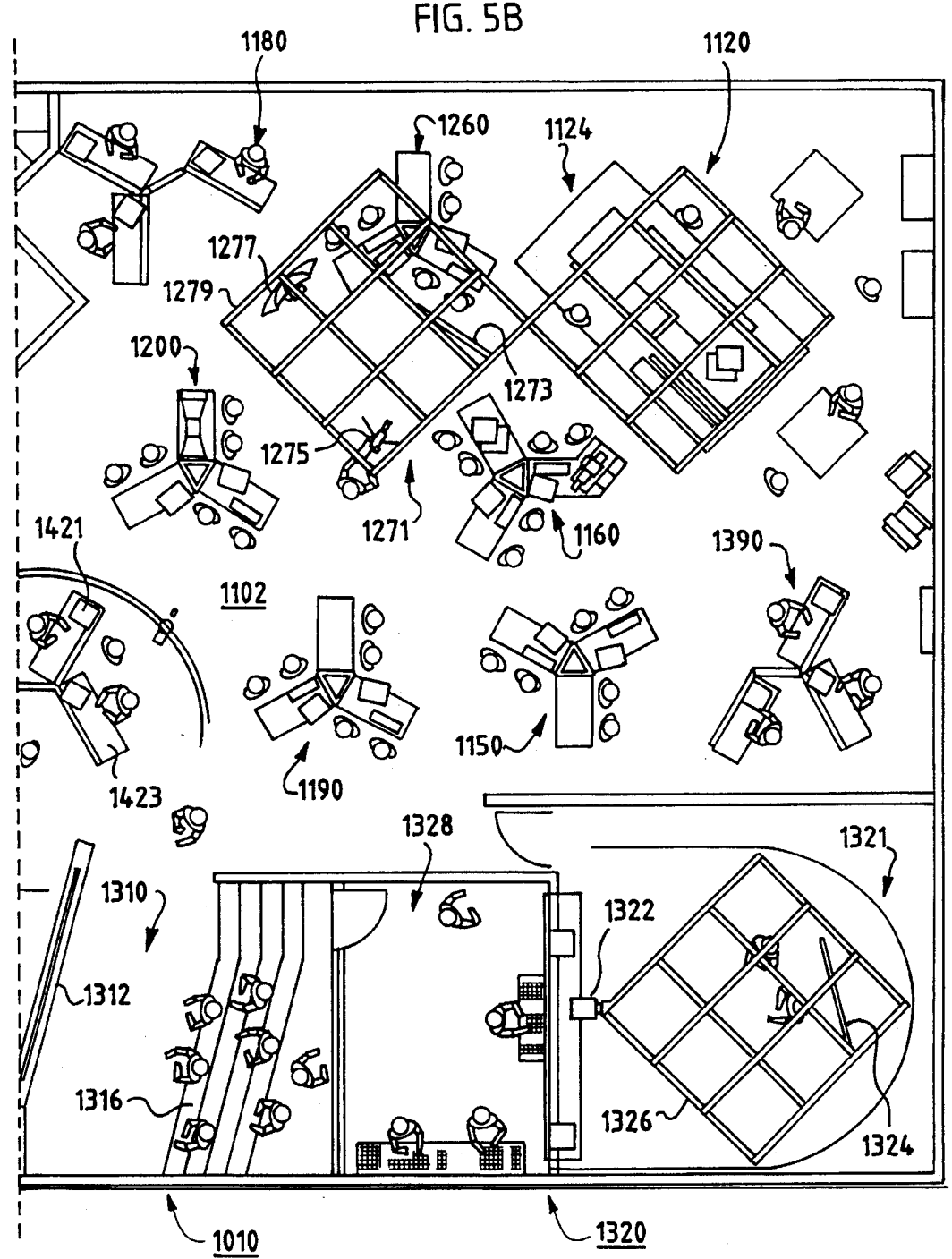

METHOD OF FACILITATING LEARNING USING A LEARNING COMPLEX

TECHNICAL FIELD

The present invention relates to a learning system, and a method of using it. More particularly, the learning system relates to an improved system for facilitating greatly the learning process for large numbers of people being exposed to a learning environment at the same time.

BACKGROUND ART

Various different learning systems have been employed in the school environment for many years. For example, school systems have utilized various kinds of learning equipment, such as computers, and other mechanical and chemical test equipment, in a laboratory setting in the schools for assisting the student in learning science and other related skills. Typically, a laboratory setting within the school has been in the form of a large number of work benches positioned against the walls of a room where students can perform their experiments to facilitate the learning of scientific principles.

In order to better utilize the space, work/learn islands have been positioned away from the walls. The free-standing islands have been positioned about the laboratory area. Such an approach has proven to be highly satisfactory, because it not only enables the better utilization of the space, but also the students or learners have been able to perform experiments and complete projects in a more convenient manner within an open-space environment. The learners are able to communicate with co-learners at other islands in a more convenient and comfortable manner so as to facilitate greatly their cooperative efforts in learning various topics. Such a more open format encourages the learners to communicate freely with one another, and at the same time, to observe each other's projects due to the positioning of their stations relative to one another.

Additionally, each one of the islands is readily reconfigurable to enable learners to switch to new topics in a convenient manner. Thus, various different projects can be undertaken by the learners in the same room at the same time, whereby the learners are encouraged to share with one another information gained from their projects.

As a result, such free-standing islands, which are readily reconfigurable, greatly facilitate and encourage the learning process. Each work/learn station more readily attracts the interest of the learners, and allows each learner to progress at his or her own pace. Thus, such a system has proven to be extremely valuable and an enormous success.

It would be highly desirable to be able to extend the basic concept of the free-standing island design to a larger and more comprehensive and diversified learning system. In this regard, it would be highly advantageous to enable larger numbers of people to participate an environment so conductive to learning, and yet be able to progress in a generally orderly manner. Such a larger more comprehensive learning system should be comfortable for the learners, despite the larger group of people participating at the same time within the confines of the same space. The learners should be able to progress efficiently and effectively in an orderly process, and thus be better equipped for high education or entering the work force. Additionally, such a new and improved learning system should also be useful for adult learners, either at the same time as being used by school-aged children, or after regular-school hours.

DISCLOSURE OF INVENTION

Therefore, the principal object of the present invention is to provide a new and improved learning system, which enables larger numbers of learners to participate simultaneously in a facilitated learning experience.

Another object of the present invention is to provide such a new and improved learning system, which greatly facilitates learning in an orderly and comfortable manner by larger numbers of learners in a common environment.

Briefly, the above and further objects of the present invention are realized by providing such a new and improved learning system, which not only greatly facilitates the orderly learning by larger numbers of people in a common environment or facility, but also encourages the learning of a more complex and diverse number of topics in a more comfortable manner.

This learning system includes a re-configurable learning zone composed of a large number of free-standing work/ learn islands distributed about a large open interior space of a building structure, to provide for a variety of re-configurable areas to facilitate the learning of a variety of topics or subject matters to be learned. A series of fixed learning zones are disposed generally along the periphery of the interior space to serve as meeting and project areas to help facilitate a group of advanced learners that has progressed from initiatory activities at the re-configurable islands to cooperating with one another in complex team projects. The re-configurable zone is disposed intermediate to an entrance way or gateway to the interior space and the remotely located fixed learning zones, so that as the learners enter the space via the entrance way, they are exposed to substantially the entire context of the arrangement of learning zones with the proximate zone being of lessor complexity and the more remote zone or zones being of greater complexity to help provide the learners with a more comfortable feeling upon entering and progressing through the learning environment, thereby facilitating and enriching the learning experience to achieve a balance between the complexity of the topics being learned and the arrangement and configuration of the learning environment for a relatively large number of learners being exposed to the system.

BRIEF DESCRIPTION OF DRAWINGS

The above-mentioned and other objects and features of this invention and the manner of attaining them will become apparent, and the invention itself will be best understood by reference to the following description of the embodiment of the invention in conjunction with the accompanying drawings, wherein:

FIG. 5 is a plan view of another learning system, which is also constructed in accordance with the present invention.

BEST MODE FOR CARRYING OUT THE INVENTION

Figure 1B:
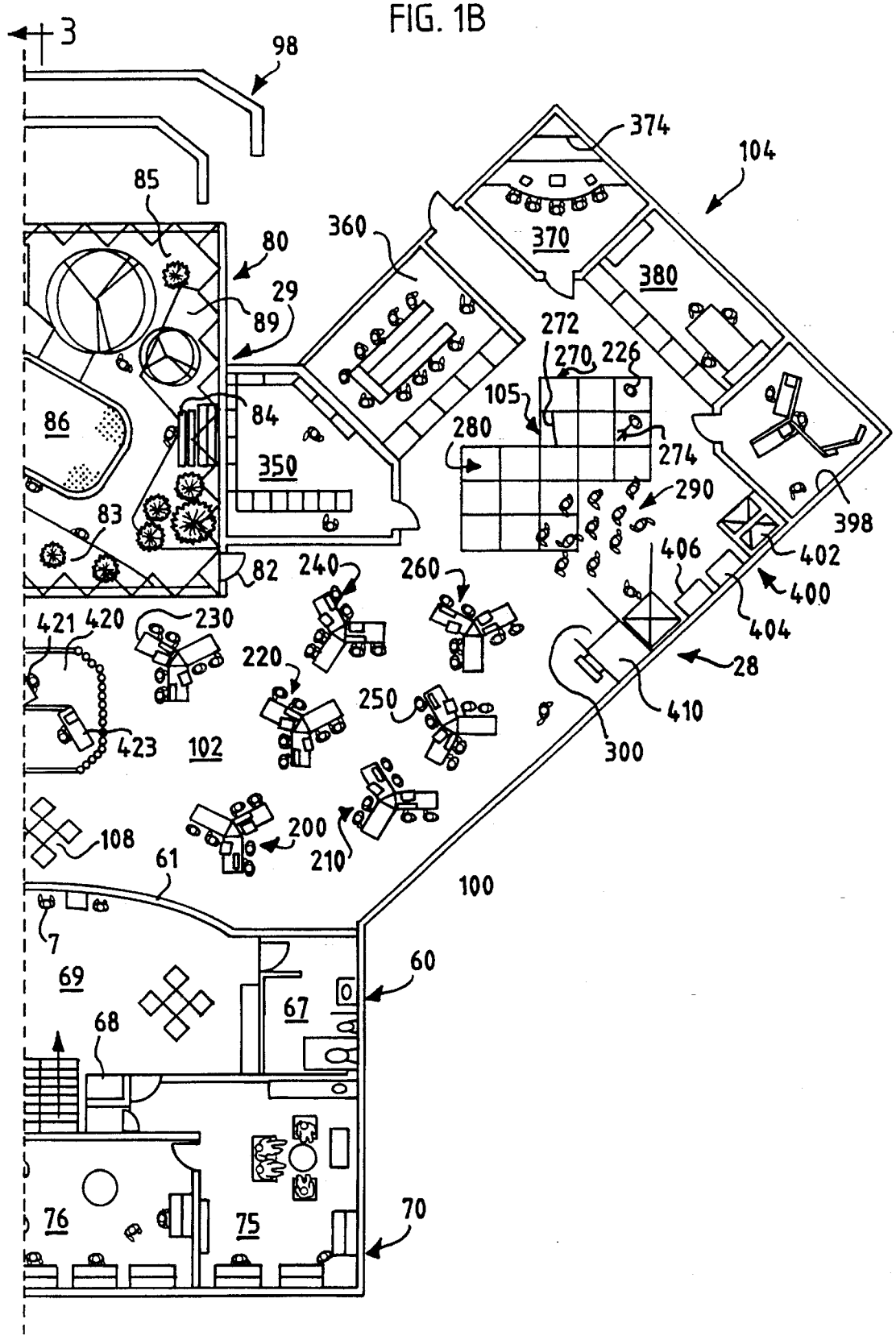
FIG. 1 is a plan view of a learning system, which is constructed in accordance with the present invention.
Figure 2:
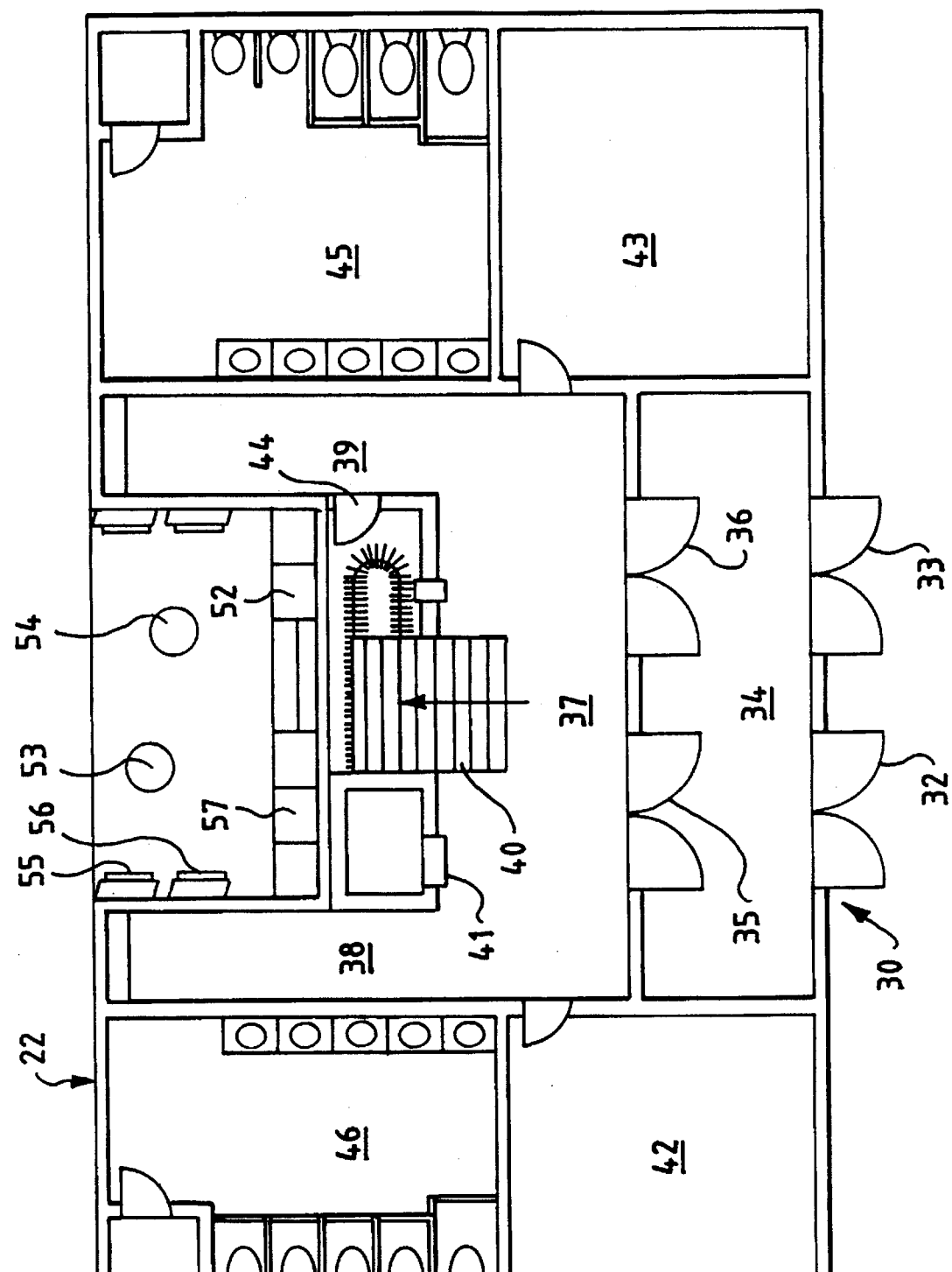
FIG. 2 is a partially broken away plan view of a lower-level entry way of the learning system of FIG. 1.
Figure 3:
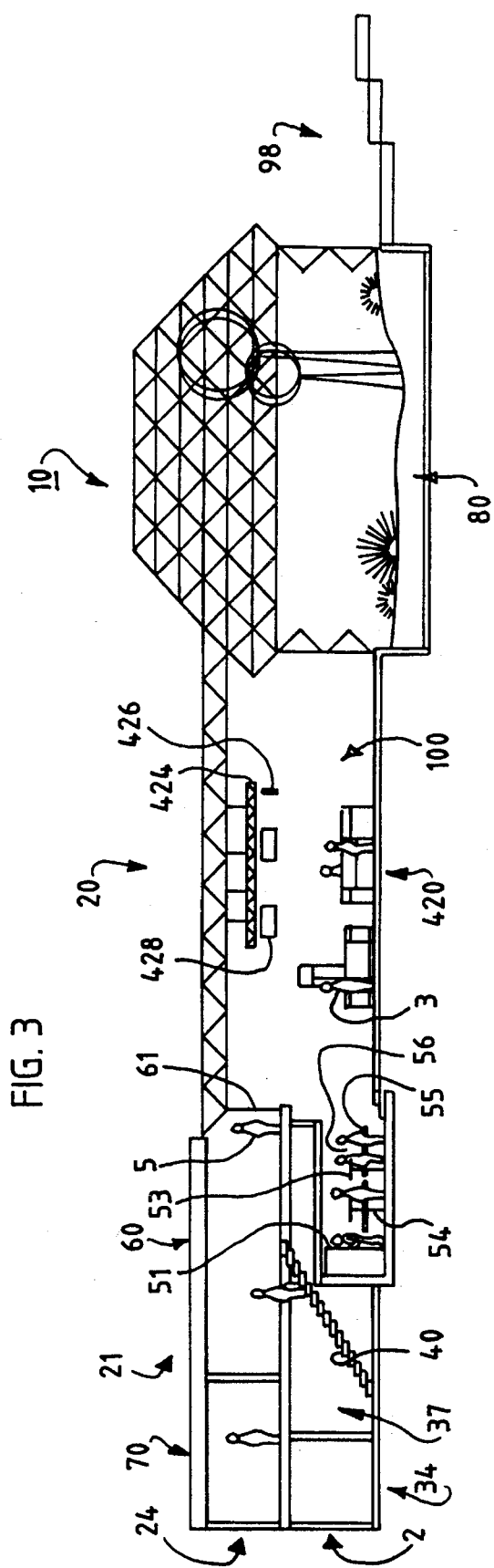
FIG. 3 is an elevational view of the learning system of FIG. 1.

Referring now to the drawings, and more particularly to FIGS. 1, 2, and 3 thereof, there is shown a learning system 10, which is constructed according to the present invention. The system 10 helps encourage the development of learning skills for a large number of learners simultaneously. The learning system 10 encourages learners, such as learners 1 and 3, to develop and to enhance greatly a desire for learning, and learning-to-learn skills, enriches the traditional educational values in a context which teaches a new set of basic skills for the information age, and enhances interpersonal skills and the ability to work cooperatively with one another.

The learning system 10 includes a multi-level "Y"-shaped free-standing building structure 20, having a lower branch 21, a left branch 26, and a right branch 28. Within the branches 21, 26, and 28, the learning system 10 is separated into an entrance threshold area 30, a macro-facilitation area 60, an administration area 70, a biotech habitat area 80, and a main learning area 100. Each of the areas 30, 60, 70, 80, and 100 is associated with a particular activity which occurs within the respective area, yet the areas 30, 60, 70, 80, and 100 are dependent upon one another. The areas 30, 60, 70, 80, and 100 are situated adjacent to one another, permitting ease of movement between the areas 30, 60, 70, 80, and 100. In this way, information can be freely exchanged between the areas 30, 60, 70, 80, and 100.

Outside the structure 20, the exchange of information does not end. Located immediately adjacent to the biotech habitat area 80, and outside of the structure 20, is an outdoor amphitheater area 98, wherein learners, such as learners 1 and 3, can participate in discussions while observing activities within the biotech habitat area 80.

Access to the learning system 10 is a accomplished by way of entrance threshold area 30 on a lower level 22 of branch 21. Once inside the entrance threshold area 30, learners 1 and 3 can reach the macro-facilitation area 60 on upper level 24 of branch 21 or they can proceed to the main learning area 100 directly. Should learners 1 and 3 choose to move up to the macro-facilitation area 60 on the upper level 24, learners 1 and 3 can proceed on to the administration area 70, also on the upper level 24, immediately adjacent to the macro-facilitation area 60.

On the other hand, learners 1 and 3 may instead proceed directly to the main learning area 100. From the main learning area 100, which extends into both the left branch 26 and the right branch 28, the biotech habitat area 80, positioned at an intersection 29 of the left branch 26 and right branch 28, can be readily observed or accessed. In this way, all areas 30, 60, 70, 80, and 100 are in communication with one another, thereby reducing any perceived barriers and increasing the creativity of learners 1 and 3.

Considering now the entrance threshold area 30 in greater detail, with reference to FIG. 2, the entrance threshold area 30 includes a pair of outer doors 32 and 33 which open up to a vestibule area 34. A pair of interior doorways 35 and 36 connect the vestibule area 34 to a lobby 37. Spaced apart hallways 38 and 39 connect the lobby 37 to the main learning area 100. Adjacent to one end of the lobby 37 is a mechanical room 42 and adjacent to the other end is an electrical/utility room 43. A closet 44 is accessible from hallway 39. Situated between hallways 38 and 39, and facing vestibule 37, is a set of stairs 40 and an elevator 41, which provide access to the macro-facilitation area 60 on the upper level 24.

The entrance threshold area further includes restrooms 45 and 46 adjacent to rooms 43 and 42, respectively. While restrooms 45 and 46 are located in the entrance threshold area 30, access to the restrooms 45 and 46 is accomplished from the main learning area 100. Similarly, the entrance threshold 30 includes a deli restaurant area 50, located between hallways 38 and 39, which can only be accessed from the main learning area 100.

As best seen in FIG. 3, the deli restaurant area 50, is offset from the main learning area 100. Vending machines, such as vending machines 51 and 52, stand along the wall opposite the main learning area 100. Wall-mounted seating pads such as wall-mounted seating pads 55 and 56, are attached to the opposite facing walls of the deli area 50 at approximately buttocks level and tables 53 and 54 provide temporary rest supports for learners 1 and 3 during brief break periods, yet allow the learners 1 and 3 to observe the activities of the main learning area 100 at the same time.

At the upper portion of the set of stairs 40, or the highest rising point of the elevation 41, is the macro-facilitation area 60. Considering now the macro-facilitation area 60 in greater detail with reference to FIG. 1, the macro-facilitation area 60 includes a somewhat rectangular central training room 69 and oppositely disposed restrooms 66 and 67. In the wall directly across from the stairs 40 is a curved window 61 which permits facilitators, such as facilitators 5 and 7, to observe the activities taking place in the main learning area 100. As best seen in FIG. 3, window 61 is substantially equivalent in height to the floor to ceiling height of upper level 24.

Work tables, such as table 62, located near window 61 permit facilitators 5 and 7 to take notes regarding their observations. Displays 63 and 64 may be provided within the interior of room 69 to permit the facilitators 5 and 7 to see accomplishments of learners 1 and 3 while a telephone booth 68 in the wall opposite of window 61 permits the facilitators 5 and 7 to communicate in privacy with the outside world. Storage lockers, such as storage locker 65, may also be provided.

The macro-facilitation training area 60 overlooks the main learning area 102 and provides an area where facilitators-in-training and their mentors can observe, analyze, and evaluate the effectiveness of learning-facilitation strategies and techniques.

Considering now the administration area 70 in greater detail, with reference to FIG. 1, the administration area 70 includes an administration suite 71 on one side and a learning orchestration suite 74 on the other side. The administration suite 71 is divided into two sections, a general office area 72 and a conference room 73, where administrative matters are handled. The learning orchestration suite 74 includes a reception area 75 for relaxation purposes and a work room 76 for aiding facilitators 5 and 7 in accomplishing their work.

Considering now the main learning area 100 in greater detail, with reference to FIG. 1, the main learning area 100 is mostly open and has a large area, such as between about 6,000 square feet and about 15,000 square feet, and can accommodate up to 150 learners, such as learners 1 and 3.

The main learning area 100 comprises two portions, an interior portion 102 where the main learning activities take place and a periphery portion 104 where the information gained from within the interior portion 102 is refined, prepared, and presented in a final form.

In regard to the interior portion 102, learners 1 and 3 actively engage in learning at islands, such as a manufacturing island 110, an entertainment island 130, a science exploration island 140, an enterprise island 150, a fabrication island 160, a cybernarration island 170, a systems island 180, an advance media island 190, a testing and data acquisition island 200, a transportation island 210, an applied math island 220, a communications island 230, a material science island 240, a soft prototyping island 250, and a human factors island 260. Although the activity at each of the islands 110, 130, 140, 150, 160, 170, 180, 190, 200, 210, 220, 230, 250, and 260 is different from activities and the other islands, each island is constructed in a similar manner.

As islands 110, 130, 140, 150, 160, 170, 180, 190, 200, 210, 220, 230, 250, and 260 are substantially similar, only the construction of island 110 will be considered in greater detail. Manufacturing island 110 includes three reconfigurable work/learn stations 112, 114, and 116 joined together to form a "Y". At the intersection of the three stations 112, 114, and 116 is a triangular pylon 118 which rises upwardly from the stations 112, 114, and 116 and which provides a conduit for electricity, air, and other linkages to the local area network of information and multimedia instruction which connects all of the islands with one another.

Islands 150 and 180 are similar to the other islands 110, 130, 140, 150, 160, 170, 180, 190, 200, 210, 220, 230, 250, and 260 in that islands 150 and 180 are constructed from three reconfigurable work/learn stations arranged in a somewhat "Y" shaped configuration. However, the work/learn stations of islands 150 and 180 do not converge at a pylon, such as pylon 118.

In utilizing the islands 110, 130, 140, 150, 160, 170, 180, 190, 200, 210, 220, 230, 250, and 260, learners 1 and 3 begin with mastering the skills developed at the innermost islands, such as islands 110, 130, 140, 200, and 230. The islands are arranged in a gradation of complexity. Thus, as skills are developed, learners 1 and 3 gradually move outwardly from the innermost islands, and on to more challenging learning activities. Eventually, the learners 1 and 3 will have obtained enough skills, creative thinking and communications abilities to prepare a presentation of their project at the periphery portion 104.

Beginning with the manufacturing island 110 of the interior position 107, learners 1 and 3 will develop basic skills such as depicting a product utilizing computer aided drafting, planning and organizing a production process (including workpiece control), and designing appropriate production-cell configurations utilizing plan layout modeling components.

The entertainment engineering island 130 provides learners 1 and 3 with the wherewithal for the production of computer-assisted graphic animations and construction of lifelike robotic or "animatronic" creatures that are synchronized with compositions on MIDI musical instruments. Learners 1 and 3 become originators, not just passive recipients, by participating in the development of entertainment products.

The science explorations island 140 provides learners 1 and 3 with apparatus, software, and other learning support for study and project work in the areas of mechanics, pneumatics, optics, holography, and weather monitoring.

The enterprise island 150 enables learners 1 and 3 to experiment with product engineering processes within simulated business contexts. The island 150 provides ample opportunities for realistic applications of algebraic formulae and statistical techniques as learners 1 and 3 discover, implement, and test opportunities for process improvement.

The fabrication island 160 provides a setting where the ability of learners 1 and 3 to make determinations of the best ways to fabricate objects is enhanced by acquiring knowledge of a wide range of conversion processes. Beyond sawing, drilling, and bending, learners 1 and 3 investigate industrial process such as water-jet cutting, electrical discharge machining, ultrasonic welding, sintering, and stereolithography. In addition, learners 1 and 3 will compare and contrast production processes to establish a conceptual framework to guide future decisions. Also, learners 1 and 3 have the ability to operate a computer-numerically-controlled milling machine directly from CAD-generated programs.

At the cybernarration island 170, learners 1 and 3 access software and learning support for storyforming, writing, and editing.

The systems island 180 is where learners 1 and 3, applying systems thinking, provides simulations to test their design ideas. Computer-based modeling prepares learners 1 and 3 to take "the long view" during the project development process. Learners 1 and 3 should become proficient in the use of "alternative futures" conception sets to create complex, dynamic models of possible outcome.

The advanced media island 190 enables learners 1 and 3 to utilize powerful tools of computer animation and interactive multi-media. In this regard, the advanced media island 190 provides an additional service for the creative minds of the learning community.

The testing and data acquisition island 200 supports reality checks to insure that learners 1 and 3 assumptions, mathematical calculations, and predictions about the characteristics and performance of physical phenomena are accurate and therefore usable. Learners 1 and 3 use apparatus at island 200 to determine the structural integrity of bridges and the aerodynamic performance of airfoils or to monitor seismographic of tectonic events. Learners 1 and 3 can also assess the growth-supportive factors inside a hydroponic greenhouse by means of sensors and data acquisition software.

The transportation island 210, provides for examining the design of vehicles, transportation ways, and terminals by simulating and comparing the effectiveness of design alternatives. Further dealing with the transportation of goods or people, learners 1 and 3 learn how to apply mathematical and technological principles to move the right thing to the correct destination, safely and effectively.

The applied math island 220 is provided with software and learning support for the study of mathematical concepts, principels and procedures, and their applications to other projects being completed at other islands.

The communications island 230 engages learners 1 and 3 in informative and artistic creation processing and presentation. They combine electronic imaging and photomanipulation with word processing and computer-aided publication to create new forms of expression.

The material science island 240 furnishes resources for scientifically analyzing the properties of materials, building composites, and layered material systems, and for a solving problems by using "intelligent" materials. In today's world, material science takes us well beyond monolithic materials available in sheet, rod, ingot, and similar forms to an unprecedented level of sophistication. Learners 1 and 3 can contemplate superconductive materials that allow electricity to flow unhampered by resistance at this island 240. Other projects which a learner 1 and 3 can contemplate are a non-mechanical louver made from a specially formatted alloy that redirects airflow by changing its shape as temperatures change (manifesting the shape memory effect), or a wind tunnel experiment, where paint applied to an airfoil glows brightly to indicate regions of low pressure (courtesy of a pressure-sensitive coating). The soft prototyping island 250, presents learners 1 and 3 with an opportunity to learn to develop product concepts using a variety of representational tools to communicate their ideas. Learners 1 and 3 practice many of the methods that industrial designers employ to develop products, i.e., 3D CAD modeling, fly-by animation, interactive physical simulation, and foam or plastic prototyping.

The human factors island 260 supports activities that relate characteristics of the human body to design endeavors. The human factors island 260, confronts learners 1 and 3 with not only "human scale", but also biological and environmental issues, leading to a greater understanding of people including their physical attributes, their abilities, and their limitations. Consideration is given to equipment design, task design, and access design.

While the islands 110, 130, 140, 150, 160, 170, 180, 190, 200, 210, 220, 230, 240, 250, and 260 occupy the majority of the interior portion 102, other areas within the interior portion 102 also have activities associated with them. In this regard, the interior portion 102 also includes a concurrent engineering zone 120, a mini studio area 270, a technolorium area 280, a neighborhood workshop area 290, and an ergonomics area 300. While these areas 120, 270, 280, 290, and 300 do not include re-configurable work/learn stations, as do the islands, these areas nonetheless provide learning activities which are adaptable and re-configurable according to need.

The concurrent engineering zone 120, provides for, by means of a modular equipment system and multi-media performance supports, provides for development of products by integrating formerly independent processes. In a world of rapid change, taking things one step at a time is not good enough. Only rapid-response enterprises will configure fast enough to take advantage of new opportunities, or to respond to contrast competitors' challenges. Establishing enterprise-wide concurrency depends on developing the skills of cross-functional teams working simultaneously on a broad-based project. Thus, in the concurrent engineering zone 120, learners 1 and 3 plan, organize, and operate concurrently to create both a product and downstream production, sales, and support processes.

An extension of the concurrent engineering zone 120 is the prototype manufacturing cell 124. The prototype manufacturing cell 124, encourages learners 1 and 3 to be flexible, which is partially an attitude of the mind and a disposition to do things differently, if necessary, to get a desired result. Changing production requirements demand that production equipment be re-configurable. Advanced learners, such as learners 1 and 3, using a special collection of modular "plug-compatible" components design, assemble, test, and modify a prototype of a production cell that can fabricate a product and yet be capable with re-configuration of fabricating a different product as product specifications are changed.

The mini-studio 270 enables learners 1 and 3 to quickly document on video tape their activities in the work/learn environment utilizing equipment capable of rapid deployment. The mini-studio 270 includes an overhead grid 105, having studio lighting (not shown) and a retractable background paper curtain 272, along with a background screen 272, a video camera 274, and an audio pick-up (not shown) to allow for maximum usage in minimis set-up time.

The technolorium 280, provides a forum for showcasing learner accomplishments. The technolorium 280 features captioned illustrations, kinetic models, and interactive videos that share the insightful creations of learners 1 and 3 with peers and visitors alike.

The neighborhood workshop 290, is an open area which provides for the learning of new skills appropriate to community service projects, e.g., visualizing, teaming, organizing, designing, and graphing intentions.

The ergonomic area 258, is an extension of the soft prototyping island 250, allowing learners 1 and 3 to create life-size mock-ups of proposed physical settings to provide three-dimensional verifications of ergonomic principels.

Thus, all of the islands 110, 130, 140, 150, 160, 170, 180, 190, 200, 210, 220, 230, 240, 250, and 260, in combination with the areas 120, 270, 280, 290, and 300, identify a zone 109 of intermediate complexity. Once learners 1 and 3 have entered three of the entrance thresholds 30 into the zone 109 of intermediate complexity, learners 1 and 3 attempt to move from one island to the next, or from island to area, by working in teams, to increase their basic overall knowledge of all the subjects they may be learned about at the various islands and areas. In this way, learners 1 and 3 become knowledgeable in many facets of information and information processing which will be beneficial the Information Age. With their new-found knowledge, learners 1 and 3 must advance to the next level of knowledge, and they must be able to interact with one another in order to present and defend their ideas.

In this regard, the learning system includes an outer zone 107 of increasing complexity which is located along a periphery 104 of the structure 20.

The outer zone 107 includes a living wall area 310, a digital video area 320, a critique club 330, a human life-support systems designed area 340, an intermediator area 350, a meeting room area 360, a collaboration cove area 370, a special projects area 380, and finally an entrepreneurship zone 390.

The living wall area 310 includes a wall 312 for video or video phone projection, a video projector 314 for producing a video image, and seating components, such as stair seating 316. Learners 1 and 3 convene here to engage in seminars, discussions, and group teleconferencing. The area 310 resembles a micro-auditorium, but without the restrictions of a permanent configuration, as seating components 316 are capable of being pre-arranged to allow for a variety of discussion zones.

The digital video studio area 320, provides technology for computer-based video production. In this regard, the video area 320 includes a digital video studio 321 for the creation of video productions. The digital video studio 321, includes a sensor-responsive video camera 322 which is capable of tracking the movement of a learner within the studio 321. Thus, an individual learner, such as learner 1, could produce a studio segment without the aid of another learner, such as learner 3. The digital video studio further includes a background screen 324, and an overhead grid 326 for supplying lighting (not shown).

The studio video editing booth 328 is located immediately adjacent to the digital video studio 321.

Working entirely in the digital domain, learners 1 and 3 engage in everything from pre-production planning to camera moves and background artwork, to non-digital editing. The communication skills of learners are honed through their involvement in storyforming, storyboarding, scene composition, continuity scripting, the creation of transition effects, and sound-integration experiences.

The critique club area 330, enables learners 1 and 3 to receive feedback from other learners in the learning community. A number of information screens, such as screens 332, 334, and 336 are provided for projecting or displaying. The critique club further includes a semi-circular seating arrangement 338, centrally located in the critique club 330, which is arranged to enable a group of learners to sit around the semi-circular portions of the arrangement 338, so that they may view the presenter and the screen 332, 334, and 336, and simultaneously maintain visual contact with.

In this way, learners 1 and 3 in the critique club area 330 can display prototypes, share proposals, or launch "trial balloon" notions. Through systematic processes of benchmarking, evaluating, and critiquing, the learners learn to express and receive helpful appraisals representative of differing perspectives.

The human life-support systems design area 340 is located immediately adjacent to the biotech habitat 80. The human life-support systems design area 340 facilitates the study and experimentation relative to the design of human life-support systems in terrestrial or extraterrestrial environments. The human life-support systems design area 340 includes a bathroom facility 341, having a toilet 342 and a shower 343. A preparation table 345, is located within the area 340 for conducting experimentation and for preparing foods produced in the biotech habitat area 80. A serving counter 347, provides access to the interior portion 102. A folding barrier 348, permits the human life-support systems design area 340 to be sealed off from the interior when desired.

The intermediator system area 350 is the multi-media library nerve center for the islands of the inner zone 109. The intermediator system area 350 contains a large library of multi-media components which can be retrieved by learners 1 and 3 from throughout the learning system 10. In this way learner 1 can access any of the multi-media components within the intermediator system area 350 without having to leave the island or the area at which learner 1 is.

The meeting room area 360 includes a table 362 where learners 1 and 3 can meet and discuss various issues related to their respective projects.

The collaboration cove area 370 is a sheltered space wherein learners 1 and 3 along with several other learners can engage one another in metacognition or jointly coordinate and manipulate their projects, while developing and evaluating their teaming efforts. This high-performance meeting room empowers learners 1 and 3 to engage in computer-aided teaming. In the cove area learners 1 and 3 work on the same project or "meaning-making" documents in real time while receiving feedback on their teaming and collaboration effectiveness. In this regard, the collaboration cove includes an angular-faceted desk 372 facing a projection screen 374. The angular-faceted table 372 and projection screen 374 are arranged so that learners 1 and 3, when seated around the angular-faceted table 372, can simultaneously view one another as well as the screen 374.

The special projects area 380 provides an open space where learners 1 and 3 can discuss long-term projects for group participation.

The entrepreneurship area 390 provides the final phase of the education experience of learners 1 and 3. The entrepreneurship area 390 offers the learners 1 and 3 integrative culminating experiences in formulating, prototyping, and testing a simulated enterprise. Learners 1 and 3 explore contemporary business practices such as concurrent engineering, process analysis, multi-venture, virtual-organization networking, and total quality management. Activities pursued in the entrepreneurship area 390, provide practical experience for learners 1 and 3, and may lead to the learners' 1 and 3 attempting in the real world their business plan developed in the entrepreneurship zone area 390.

The interior space 102 further includes an overhead grid 106, which is suspended from the ceiling from the structure 26 in the vicinity of the islands 150, 160, 170, 180, and 190. The grid 106 provides a stable platform from which learners 1 and 3 may suspend ongoing projects for better visualization. In addition, the interior space 102 includes other elements which, although not directly used in the transmission of information, nonetheless support the learning experience. In this regard, the interior space includes a storage area 400, and extendable framework 406 which can be opened up to define a space for presentation purposes, and a swing out storage area 410 to store rolling process carts with storage and display panels, primarily for use by adults working on community service projects.

As the interior area 102 includes so many activities taking place simultaneously, a learner exhibition 108 is provided to the interior area 102 adjacent to the entrance threshold area 30. From time to time, each learner, or team, will be required to conduct a study of merit and will upon an appointed time, provide an exhibition to display, present to others, and defend at the learner exhibition area 108.

While the learning activity which takes place in the main learning area 102, and the periphery area, enable learners 1 and 3 to expand their skills and knowledge, interaction with the outside world is necessary in order to access and share information with those remotely located. In this regard, the learning system 10 is provided with a global common area 420. The global commons area 420, provides the electronic gateway to the outside world beyond the main learning area 102, Powerful telecommunication links enable learners 1 and 3 to "surf" through network forces in search of relevant information. The learner 1 and 3 learn how to search out, sort, and exchange useful information, in how to track trends and to predict impact.

The global common area 420 includes an island similar to the island previously described, having re-configurable work/learn stations 421, 422, and 423. As best seen in FIG. 1 and 2, an overhead grid 424 is suspended from the ceiling over the global commons area 420. Attached to the overhead grid 424, a number of electronics information displays, such as electronic information displays 426–428, continuously "publish" news items of interest to the general populous of the learning system 10. In this way, learners 1 and 3 can be apprised of events occurring outside of the structure 20. Considering now the biotech habitat area 80, in more detail with reference to FIG. 1, the biotech habitat area 80 includes an agricultural biome 83, a desert biome 84, a rainforest biome 85, and a marine biome 86. The biotech habitat area 80 is accessed by an airlock 81. In the event of an emergency, an additional exit 82 permits occupants of the biotech habitat area 80 to escape to the learning area 102. The biotech habitat area 80 is self-supporting and produces all the nutritional needs of an occupant. To this end, the boitech habitat area 80 also includes a wheat treatment facility 88 and a compose facility 89 to treat waste products and a rice bed 90, and an animal area 92 for the production of foodstuff.

Learners 1 and 3 explore ecologically sensitive ways to manage natural resources with a study of hydroponics, aquaculture, renewable biological fuel sources, bio-derived materials, and waste technology, through cooperative studies where similar learning systems elsewhere (not shown), learners 1 and 3 can exchange and analyze biotech data, and formulate, discuss, and disseminate matters of public policy.

Figure 4:
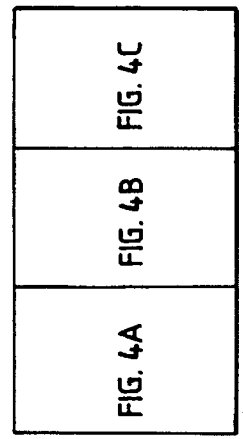
FIG. 4 is a diagrammatical view of a layout of another learning system, which is also constructed according to the present invention, and which is generally similar to the learning system of FIG. 1, generally illustrating various relationships between components or elements of the learning system.
Figure 4A:
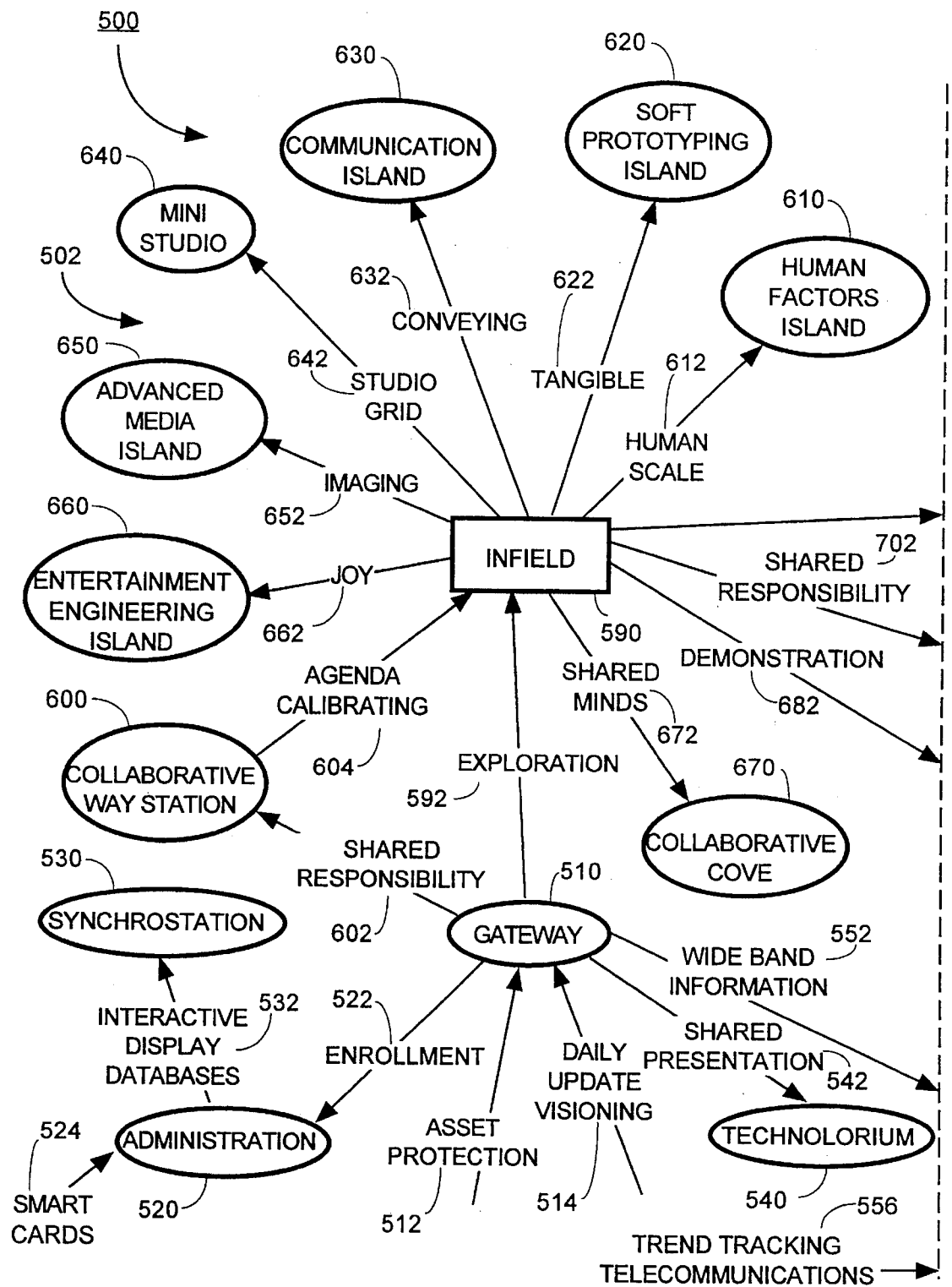
Figure 4B:
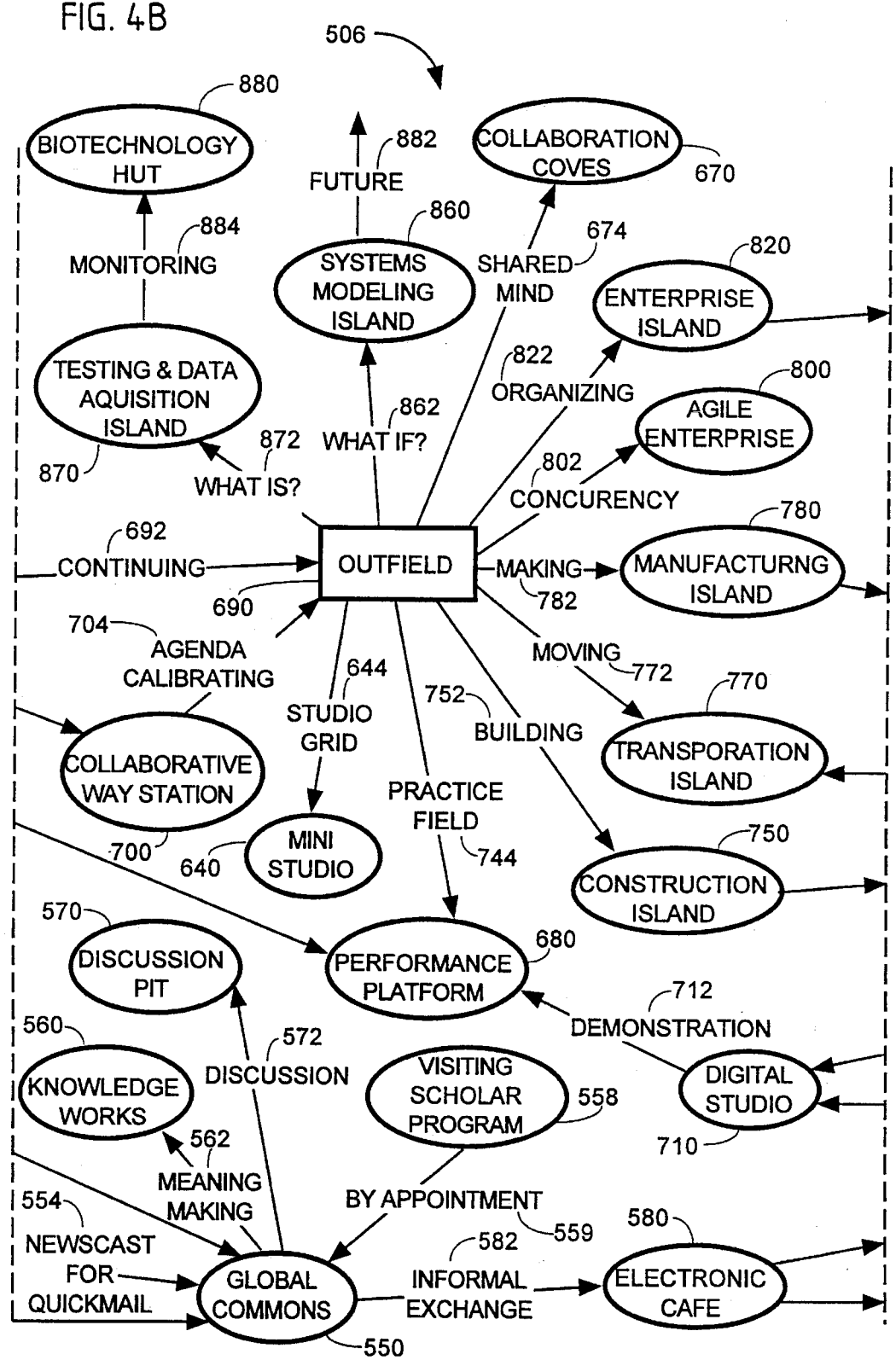

Referring now to the drawings, and more particularly FIG. 4 thereof, there is shown a learning system 500 which is similar to the learning system 10 of FIGS. 1, 2 and 3.

The learning system 500 includes three zones or levels which represent the relative accumulation of knowledge by a learner (not shown). In this regard, the learning system 500 includes a lower level zone 502, an upper level zone 504 and a peripheral zone 506. Both zones 502 and 504 are located within a main learning area (not shown), such as the main learning area 100 of FIG. 1. In addition, the learning system 500 includes a peripheral zone 506 which is generally located along the periphery of a structure, such as the structure 20 of FIG. 1.

Initially, a learner begins the learning process of the learning system 500 in the lower level zone 502. In this regard, the subject matter studied in this lower level zone 502 is of moderate complexity, and when accomplished, the confidence of the learner is enhanced. Thus, the learner is confident to move on to the upper level zone 504, where the subject matter is increasingly more complex.

Once in the upper level zone 504, the learner again must use the knowledge acquired in the lower level zone 502 to accomplish tasks in the upper level zone 504. Thus, the knowledge, skill and competence of the learner is substantially increased by building on a base foundation, which the learner has mastered from the subjects comprising the upper level zone 504. From upper level zone 504, the learner progresses to the peripheral zone 506 where the accomplishments of the learner are presented and discussed among other learners.

Initially, access to the upper level zone 502 is made through a gateway 510. Entrance to the gateway may be made via an asset protection path 512 or by a daily update visioning path 514. Once at the gateway 510, the learner has the option of proceeding to the administration area 520 by way of the enrollment path 522. Alternatively, the administration area 520 can be reached by way of a smart card path 524. Once at the administration area 520, access to a SyncroStation 530 is provided through an interactive display data base path 532.

In addition to providing services for younger learners, the learning system 500 is also intended for use by older learners, such as working adults. In this regard, the older learner may proceed directly to the technolorium area 540 by way of the shared presentation path 542.

Should the learner choose not to proceed to the administration area 520 or the technolorium area 540, the learner may proceed to the lower level zone 502 or to a global commons area 550.

The journey to the global commons area 550 is taken along a wide band information path 552. Once at the global commons area 550, the learner can receive information via a newscast for quickmail path 554, or through a visiting scholar program 558 by way of an appointment path 559. With the knowledge and information gained at the global commons area 550, the learner can then disseminate that information to an electronic cafe area 580 via an informal exchange path 582, to a discussion pit area 570 via a discussion path 572, or to a knowledgeworks area 560 through a meaning making path 562.

The dissemination of information to the electronic cafe area 580 enables other learners to share in the information received at the global commons area 550 while taking a respite from learning activities. Once in the electronic cafe area 580, the learner may choose to seek out a rest room 584 or 585 by following the relief path 586 or 587, respectively.

Alternatively, the learner may proceed into the lower level zone 502. The learner proceeds directly to an infield area 590, where the learner may stop, pause, observe, and decide which new path to take, or the learner may choose to take a prolonged journey to the infield area 590 by way of a collaborative way station area 600. The collaborative way station area 600 is reached by a shared responsibility path 602. From the collaborative way station area 600, the learner proceeds to the infield area 590 via the agenda calibrating path 604.

Considering now the lower level zone 502 in greater detail with respect to FIG. 4, the lower level zone 502 includes a number of re-configurable island structures, such as a human factors island 610, a soft prototyping island 620, a communication island 630, an advanced media island 650, and an entertainment engineering island 660. These islands are reached from the infield area 590 by way of a human scale path 612, a tangible path 622, a conveying path 632, an imaging path 652, and a joy path 662, respectively.

As the user becomes more proficient in the subjects represented by the islands 610, 620, 630, 650 and 660, the learner will progress to the upper level zone 504. However, the learner may temporarily proceed to the peripheral zone 506 in order to share knowledge gained in the lower level zone 502 with others. In this regard, the peripheral zone 506 includes a mini studio area 640, a collaboration cove area 670, and a performance platform area 680. Thus, the learner may choose to proceed to the mini studio area 640 by way of a studio grid path 642, to the collaboration cove area 670 following a shared minds path 672, or to the performance platform area 680 by way of a demonstration path 682.

After obtaining as much information and knowledge as possible in the lower level zone 502, the learner now has the confidence and ability to proceed to the next level, the upper level zone 504, to continue the learner's educational growth. In this regard, the learner advances to the upper level zone 504 by proceeding to an outfield area 690 by way of a continuing path 692, or by making an intermediate stop at another collaborative way station 700 by way of another shared responsibility path 702. From the collaborative way station 700, the learner then proceeds to the outfield area 690 by way of an agenda calibrating path 704.

In the performance platform area 680, the learner receives input from a number of different sources, including a digital studio area 710, which reaches the performance platform 680 by way of a demonstration path 712. A sensor-responsive camera 730 provides input to the digital studio area 710 via a remote sensing path 732. In addition, the digital studio area 710 receives information via a bit manipulation path 722 from a digital editing booth 720.

The performance platform area 680 provides a method for a learner to express what has been learned, and invites open discussions regarding the knowledge found. As the knowledge and skills gained by the learner require continual honing, the performance platform area 680 is also accessible from the outfield area 690 of the upper level zone 504 by a practice field path 744. In this way, learners at all stages of development have access to open discussions about their accumulated skills and knowledge.

Considering now the upper level zone 504 in greater detail, the upper level zone 504 includes re-configurable island structures similar to the islands of the lower level zone 502, except that the complexity level of the activities which take place in upper level zone 504 is somewhat higher than in lower level zone 502. In this regard, the upper level zone 504 includes a construction island 750, a transportation island 770, a manufacturing island 780, an enterprise island 820, a systems modeling island 860, and a testing and data acquisition island 870. These islands are accessed by way of a build path 752, a moving path 772, a making path 782, an organizing path 822, a "what if ?" path 862, and a "what is ?" path 872, respectively.

While engaged in activities at these islands in the upper level zone 504, the learner builds upon the knowledge and skills gained previously in the lower level zone 502 in order to progress to the peripheral zone 506.

In addition to proceeding to the various island structures, the learner may choose to temporarily progress to the peripheral zone 506 in order to share the increased knowledge gained with others. In this regard, the learner may proceed to the mini studio area 640 by way of the studio group path 644, or the learner may proceed to the collaboration cove 670 by way of the shared mind paths 674. As described earlier, in the peripheral zone 506, the learner is able to present the knowledge and skills learned to date to others, and receive, in return, feedback as to the learner's position.

While working at the construction island 750, the learner utilizes the accumulated knowledge in order to produce objects based on this knowledge. In this regard, the learner may proceed to an experimental structure area 760 by way of an envelope path 762.

While at the transportation island area 770, the learner must consider many influences on the matter at hand. In this regard, outside information regarding the environmental effect on a learner's project must be considered. Thus, the learner at the transportation island area 770 may receive input regarding environmental conditions via a weather tracking path 774.

The manufacturing island area 780 develops the learner's ability to produce a working prototype. Having acquired the analytical skills necessary to produce the prototype, the next step for the learner is to proceed to a prototype manufacturing cell area 790 via a concurrent engineering path 792.

In order to expose the learner to the environment surrounding the system 500, the system 500 further included a biotechnology hut 880. From the upper level zone 504, the learner may monitor the biotechnology hut 880 from the testing and data acquisition island 870 via a monitoring path 884, or the learner may predict future occurrences within the biotechnology hut 880 from the systems modeling island 860 via a future path 882.

Considering now the peripheral zone 506 in greater detail, the peripheral zone 506 is the ultimate expression of the knowledge and skills which the learner has accumulated from the lower level zone 502 and the upper level zone 504. In this regard, the peripheral zone 506 provides the arena in which the learner presents projects which the learner has produced as a result of the accumulated skills and knowledge. Thus, the learner's ideas, thoughts, and other impressions may be presented for critical thought and creative input.

As described previously, the peripheral zone 506 includes areas for preparing presentations such as the digital studio 710, the mini studio 640, and the collaborative cove 670. In addition, the peripheral zone 506 further includes an entrepreneurial zone 830 where the learner utilizes the accumulated knowledge and skills to prepare real world solutions for the problems presented by the learner's project.

The enterprise island 820 is reached by organizing path 822 from the outfield area 690. The enterprise island 820 represents the last step that the learner must master prior to moving on to the entrepreneurial zone 830 of the peripheral zone 506.

The learner progresses from the upper level zone 504 to the peripheral zone 506 by entering the entrepreneurial zone 830 from the enterprise island 820 by way of a performance field path 832. Once in the entrepreneurial zone 830, the learner prepares the formal project for placement in an incubator, such as incubator 810, in order to observe the learner's project under real world situations.

Alternatively, the learner may access the incubator 810 by way of an agile enterprise area 800. The agile enterprise area 800 is reached via a concurrency path 802 from the outfield area 690. As a test, the learner may subject an incomplete project to the conditions of the incubator 810 directly through a performance path 812.

After the learner's project has been permitted to incubate in the incubator 810, the learner receives feedback on the performance of the project. Adjustments can then be made and resubmitted to the incubator 810 for further evaluation. When the results from the incubator 810 are satisfactory, the learner has accomplished the objective of the learning system 500. Thus, the project is in condition for application in the real world. Therefore, the learner may progress by path 842 to a franchise row 840, completing the intellectual growth of the learner through the learning system 500.

Referring now to the drawings and, more particularly, FIG. 5 thereof, there is shown another learning system 1010 which is also constructed according to the present invention. The learning system 1010 is similar to the learning system 10 except that learning system 1010 is rectangularly-shaped rather than "Y" shaped. The learning system 1010 includes an entrance threshold area 1030, a macro facilitation area 1060, a main learning area 1100, and a biotech habitation area 1080.

In use, a learner 1001 enters into the learning system 1010 through the entrance threshold area 1030. Once through the entrance threshold area 1030, the learner enters into the main run area 1100. Located on the perimeter of the main learning area 1100 are the macro-facilitation area 1060 and the biotech habitat area 1080.

Disbursed throughout the main learning area 1100 are a number of reconfigurable island structures, including a manufacturing island 1110, an entertainment engineering island 1130, a science exploration island 1240, an enterprise island 1150, a fabrication island 1160, a systems modeling island 1180, an advanced media island 1190, a testing and data acquisition island 1200, a transportation island 1210, a communications island 1230, a material science island 1240, a soft prototyping island 1250, and a human factors island 1260.

As all the islands are substantially similar to one another, only island 1110 will be discussed herein in further detail. The manufacturing island 1110 includes three reconfigurable work/learn stations, 1112, 1114 and 1116. The work/learn stations, 1112, 1114 and 1116, are arranged to form a "Y". A pylon 1118 is attached to island 1110 at the intersection of the stations 1112, 1114, 1116. Pylon 1118 provides electricity, air, and other connections to island 1110 via overhead connections.

In addition to the islands in the main learning area 1100, the learning system 1010 further includes two mini studios 1270 and 1271, a technolorium area 1280, and a concurrent engineering zone 1120.

Mini studios 1270 and 1271 are substantially similar, therefore, only the studio 1270 will be described hereinafter in greater detail. The mini studio 1270 includes a background screen 1272, a video camera 1274 and a retractable reflective screen 1276. The screen 1272, camera 1274, and reflective screen 1276 are arranged for producing videos on the spot by a learner 1001. The mini studio 1270 further includes an overhead grid 1278 which is supported from the ceiling directly over the mini studio 1270. Studio lights (not shown) may be supported from the grid 1278 to provide additional lighting.

The concurrent engineering zone 1120 includes a prototype manufacturing cell 1124 to permit the construction of further type models.

The technolorium area 1280 provides an area for group presentations and which is capable of being configured as necessary. In this regard, the technolorium area 1280 includes an overhead grid 1105 suspended from the ceiling above a technolorium area 1280 for supporting objects as required.

Along the periphery of the main learning area 1100 are fixed work/learn areas, such as a living wall area 1310, a digital video area 1320, a critique club area 1330, and a collaboration cove area 1370.

The living wall area 1310 is designed for video presentations. In this regard, the moving wall area 1310 includes a projection screen 1312, a video projector 1314 and a set of stairs 1316 for seating purposes.

The digital video area 1320 provides production and editing facilities for the creation of video productions. The digital video area 1320 includes a digital video studio 1321 and a digital editing booth area 1328. The production of videos is accomplished in the digital video studio 1321, which includes a sensor-responsive video camera 1322, a background screen 1324, and an overhead grid 1326.

The critique club area 1330 provides room for the presentation of ideas and criticism there. In this regard, the critique club area 1330 includes a semi-circular table 1332. In this way, a learner may make a presentation to a number of fellow learners who are seated around the semi-circular table 1332. While seated at the table 1332, the fellow learners are simultaneously in visual contact with one another as well as with the learner giving the presentation.

The collaboration cove area 1370 includes a semi-circular table 1332 and a screen 1374. In this way, learners may sit at the semi-circular table 1332 and review simultaneously one another and the screen 1374.

Centrally located in the main learning area 1100 is a global commons area 1420. The global commons area 1420 connects the learning system 1010 with the outside world via data connections, e.g., by Internet. The global commons area 1420 includes three reconfigurable work/learn stations 1421, 1422 and 1423.

Suspended from the ceiling above the global commons area 1420 is a circular overhead grid 1424. Information is received from outside of the learning system 1010 at the global commons area 1420, where the information is processed. Relevant information is then displayed to the other learners in the main learning area 1100 via electronic information displays (not shown). Adjacent to the soft prototyping island 1250 is located an ergonomic zone 1300. The ergonomic 1300 permits the learner to produce ergonomic products based on the calculations derived at the prototyping island 1250.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In a learning complex including a building having walls defining a large open interior space and an entrance way thereto, a method of facilitating learning, comprising:

configuring a plurality of individually spaced apart work/learn islands into a re-configurable low complexity level learning zone disposed within the interior space adjacent to the entrance way and spaced from the walls for facilitating individual learning at each of said islands by attracting learners entering the interior space via the entrance way to specific ones of said islands;

configuring a plurality of individually spaced apart advanced work/learn islands into a re-configurable high complexity level learning zone disposed within the interior space adjacent to said low complexity level learning zone and spaced apart from the walls for facilitating individual learning of advanced topics at each one of said advanced islands by attracting learners from said low complexity level learning zone, said advanced topics being more challenging than said topics, said low complexity level learning zone being intermediate the entrance way and said high complexity level learning zone for initially introducing said topics to the learners to help provide them with a more comfortable feeling upon entering and progressing through the learning environment to said advanced topics;

configuring a plurality of rooms into a fixed learning zone disposed generally along the periphery of the walls and spaced from said high complexity level learning zone for attracting learners to serve as group activity areas to help facilitate the sharing of information between a group of advanced learners who have progressed from said low complexity level learning zone and said high complexity level learning zone to participate with one another for cooperating in team projects, wherein the learners enter the interior space via the entrance way and are exposed unobstructedly to substantially the entire context of the relationship between said low complexity level learning zone, said high complexity level learning zone and said fixed learning zone;

permitting the learners entering the entrance way to move to an infield area at said low complexity level learning zone where the learners are exposed immediately to an unobstructed view of a variety of said topics being undertaken at said islands so that the learners can decide which ones of said topics are of specific interest to them;

permitting the learners to move to the selected ones of said islands for low complexity level learning facilitation purposes, whereby the learners can perform work and receive information of a relatively easy and less threatening content;

permitting the learners at said islands to move from said low complexity level learning zone upon termination of learning experiences thereat to an outfield area at said high complexity level learning zone to provide an unobstructed view of a variety of said advanced topics being undertaken at said advanced islands so that the learners can decide which ones of said advanced topics are of specific interest to them, wherein the learners utilize the knowledge obtained in said low complexity level learning zone to help them learn said advanced topics;

permitting the learners to move to the selected ones of said advanced islands for high complexity level learning facilitation purposes, whereby the learners can perform work and receive more challenging information;

providing the learners within the interior space with an unobstructed view of a variety of said group activities being undertaken at said rooms so that the learners can decide which ones of said group activities are of specific interest to them; and permitting the learners to move to the selected ones of said rooms for group interaction purposes, wherein the learners utilize the knowledge obtained in said low complexity level learning zone and said high complexity level learning zone to help them cooperate with one another for preparing a group project;

whereby the learning experience is facilitated and enriched to achieve a balance between the complexity levels of said topics and said advanced topics being learned, and the configuration of the learning environment for a relatively large number of learners being exposed and enticed into involvement with the learning process.

2. A method according to claim 1, further including introducing the learners to computer graphic animation and animatronic technology information with an entertainment engineering island.

3. A method according to claim 1, further including introducing the learners to interactive multimedia technology information with an advanced media island.

4. A method according to claim 1, further including introducing the learners to product development technology information with a soft prototyping island.

5. A method according to claim 1, further including introducing the learners to activities that relate characteristics of the human body to design projects at a human factors island.

6. A method according to claim 1, further including introducing the learners to electronic imaging and photomanipulation technology information at a communication island.

7. A method according to claim 1, further including introducing the learners to product design and production technology information at a manufacturing island.

8. A method according to claim 1, further including introducing the learners to transportation technology information at a transportation island.

9. A method according to claim 1, further including introducing the learners to test simulation technology information at a systems island.

10. A method according to claim 1, further including introducing the learners to testing and data acquisition technology information at a testing and data acquisition island.

11. A method according to claim 1, further including permitting said group of learners to collaborate and evaluate said group project at a collaboration room.

12. A method according to claim 1, further including connecting electronically the learning system to remotely located information sources with telecommunication equipment at a global commons area within the interior space.

13. A method according to claim 1, further including introducing the learners to biology and ecology technology information at a biotech habitat area.

* * * * *